US010016707B2

(12) United States Patent
Richter et al.

(10) Patent No.: US 10,016,707 B2
(45) Date of Patent: Jul. 10, 2018

(54) PIPELINE STRAINER (71) Applicant: The Metraflex Company, Chicago, IL (US)

(72) Inventors: James R Richter, Lincolnshire, IL (US); Daniel T Holbach, Palatine, IL (US); Martin I Rogin, Libertyville, IL (US); Daniel R Kish, Chicago, IL (US); James Orrico, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 194 days.

(21) Appl. No.: 14/597,634

(22) Filed: Jan. 15, 2015

(65) Prior Publication Data

US 2016/0206982 A1   Jul. 21, 2016

(51) Int. Cl.
*B01D 35/02* (2006.01)

(52) U.S. Cl.
CPC .......... *B01D 35/023* (2013.01); *B01D 35/02* (2013.01)

(58) Field of Classification Search
CPC .... B01D 2201/30; B01D 35/30; B01D 35/02; B01D 35/023
USPC ....... 210/435, 439, 446, 447, 449, 453, 454, 210/459, 460
See application file for complete search history.

(56) References Cited

U.S. PATENT DOCUMENTS

| | | |
|---|---|---|
| 2,359,938 A | 10/1944 | Quiroz |
| 2,792,120 A | 5/1957 | Tinker |
| 2,942,572 A | 6/1960 | Pall |
| 2,979,209 A * | 4/1961 | Nolden ................ B01D 29/23 210/435 |
| 3,077,176 A | 2/1963 | Pall et al. |
| 3,283,902 A | 11/1966 | Farris et al. |
| 3,591,003 A | 7/1971 | Cooper |
| 4,006,083 A | 2/1977 | Westervelt et al. |
| 4,029,042 A | 6/1977 | Juhasz |
| 4,038,189 A | 7/1977 | Dison et al. |
| 4,139,466 A | 2/1979 | Rosaen |

(Continued)

FOREIGN PATENT DOCUMENTS

| | | |
|---|---|---|
| CN | 202223967 | 5/2012 |
| CN | 203170086 | 9/2013 |

OTHER PUBLICATIONS

Patent Cooperation Treaty, PCT International Search Report from corresponding International Application PCT/US2015/065530, dated Feb. 23, 2016.

(Continued)

*Primary Examiner* — Madeline Gonzalez
(74) *Attorney, Agent, or Firm* — Greer, Burns & Crain, Ltd.

(57) ABSTRACT

A pipeline strainer having a body with a straining element therein. A portion of the straining element is in the path of fluid flowing from the inlet to the outlet of the body. A first end of the straining element may be parallel to the inlet, or may be coextensive with the inlet. The second end of the straining element may be disposed proximate a debris drain. A first axis from the inlet for fluid to the outlet for fluid and a second axis from the inlet for fluid to the debris drain may form an angle of less than 30°. A rotatable plug may be disposed in the debris drain. The straining element may include at least one corrugation. A cover plate may be removable secured to the bottom of the body of the pipeline strainer.

20 Claims, 9 Drawing Sheets

(56) References Cited

U.S. PATENT DOCUMENTS

| | | | |
|---|---|---|---|
| 4,582,605 A * | 4/1986 | Rea | B01D 29/33 |
| | | | 210/447 |
| 4,626,344 A | 12/1986 | Fick et al. | |
| 4,654,140 A | 3/1987 | Chen | |
| 4,783,256 A | 11/1988 | Cooper et al. | |
| 5,192,425 A | 3/1993 | Cyphers et al. | |
| 5,194,160 A | 3/1993 | Simonelli et al. | |
| 5,718,822 A | 2/1998 | Richter | |
| 2010/0116732 A1 | 5/2010 | Jung | |
| 2014/0027357 A1 | 1/2014 | Morris | |

OTHER PUBLICATIONS

Patent Cooperation Treaty, PCT Written Opinion of the International Searching Authority from corresponding International Application PCT/US2015/065530, dated Feb. 23, 2016.

\* cited by examiner

PIPELINE STRAINER

CROSS-REFERENCES TO RELATED APPLICATIONS

None.

BACKGROUND OF THE INVENTION

The present invention relates to a pipeline strainer are more particularly to a Y shaped pipeline strainer which has a decreased pressure drop associated with fluid flowing there through.

Pipeline strainers are used for protecting pumps, compressors, turbines, meters, automatic valves, sprinkler heads, nozzles, steam traps, heat exchangers, meters, and other pipeline equipment. The pipeline strainer mechanically removes solids from a flowing fluid with a perforated, mesh, or wedge wire straining element. The solids are retained in the straining element, allowing the fluids to flow there through and to the downstream equipment. After a certain period of time, a drain can be opened to remove the debris to avoid excess pressure drop associated with the collection of solids in the straining element.

Two common designs for pipeline strainers are the Y shaped pipeline strainers and the basket pipeline strainer. Most basket pipeline strainers are intended for horizontal or slightly inclined piping. On the other hand, the Y shaped pipeline strainers, as well as some T shaped basket strainers, can be used in horizontal, as well as vertical (downward), piping. In the Y shaped pipeline strainers, a debris collection chamber, which houses the straining element, is disposed obliquely to the flow path of the fluid thorough the pipeline strainer.

With respect to the Y shaped pipeline strainers, disposing the straining element in the body of the pipeline strainer typically requires a large opening at the end of the debris collection chamber. The opening is closed during operation with a large flange containing a series of bolts. The flange is large, requires gaskets, and is a potential leak point. Additionally, the flange impacts the amount of the straining element that may be disposed in the flow path of the fluid.

Thus, it would be desirable to provide for a pipeline strainer which increases the amount of straining element in the flow path of the fluid.

Additionally, it would also be desirable to provide a pipeline strainer that does not require a flange at the bottom of the debris collection chamber.

SUMMARY OF THE INVENTION

A new pipeline strainer has been invented which decreases the pressure drop associated with fluid passing there through. Additionally, the pipeline strainer is easy to drain and clean. These and other benefits will be appreciated in the following summary and detailed description.

According to a first aspect of the present invention, the present invention provides a pipeline strainer which comprises a body and a straining element for removing debris from a fluid passing through the body. The body comprises a Y shape, a cavity, an inlet for a fluid lying in a first plane, an outlet for the fluid, and a debris drain. The straining element comprises a first end lying in a second plane and a second end. The straining element is disposed in the cavity of the body such that the second plane is generally parallel to the first plane. The second end of the straining element is disposed proximate the debris drain.

In at least one embodiment, the first end of the straining element and the second end of the straining element are both open ends.

In some embodiments, the first end of the straining element and the inlet of the body are co-planar.

In one or more embodiments, the straining element includes at least one corrugation disposed between the first end of the straining element and the second end of the straining element.

In various embodiments, the first plane and the second plane are coextensive.

In one or more embodiments, the debris drain comprises at least one threaded aperture and at least one plug for each threaded aperture. It is further contemplated that the at least one plug of the debris drain further comprises at least one threaded aperture and may further comprise at least one plug for the at least one threaded aperture in the plug of the debris drain.

In various embodiments, the first end of the straining element includes a flange, and the inlet of the body includes a flange with a groove sized to receive the flange of the straining element.

In some embodiments, at least one of the inlet for fluid and the outlet for fluid includes a flange having a plurality of apertures, each aperture being configured to receive a fastener.

In at least one embodiment, a first axis from the inlet for fluid to the outlet for fluid and a second axis from the inlet for fluid to the debris drain form an angle of less than 30°. It is contemplated that the angle is greater than 9.5°.

In a second aspect of the present invention, the invention provides a pipeline strainer which comprises a body and a straining element. The body comprises a Y shape, a cavity, an inlet, an outlet, and a debris drain. The straining element is disposed in the cavity of the body and comprises a tubular body with a first end and a second end. The straining element includes at least one corrugation disposed between the first end and the second end.

In some embodiments, a longitudinal axis of the tubular body extends from the first end to the second end. The first end of the straining element may be planar and lie in a plane oblique to the longitudinal axis of the tubular body. The second end of the straining element may also be planar and lie in plane substantially perpendicular to the longitudinal axis of the tubular body.

In various embodiments, the debris drain comprises at least one threaded aperture and at least one plug for each threaded aperture. It is contemplated that at least one plug of the debris drain further comprises at least one threaded aperture and at least one plug for the at least one threaded aperture in the plug of the debris drain.

In one or more embodiments, the first end of the straining element includes a flange, and the inlet of the body includes a flange with a groove sized to receive the flange of the straining element.

In some embodiments, the straining element is disposed in the cavity of the body such that the first end of the straining element lies in a plane generally parallel to a plane including the inlet of the body and the second end of the straining element is disposed proximate the debris drain.

In at least one embodiment, the first end of the straining element and the second end of the straining element are both open ends.

In various embodiments, the body further comprises a cover plate and the cover plate includes the debris drain.

In a third aspect of the present invention, the invention provides a pipeline strainer comprising a body and a straining element. The body comprises a Y shape, a cavity, an inlet for fluid, an outlet for the fluid, and a debris drain. A first axis from the inlet for fluid to the outlet for fluid and a second axis from the inlet for fluid to the debris drain form an angle of less than 30°. The plug comprises a second threaded bore and may or may not include a second plug. The straining element comprises a first end and a second end. The first end of the straining element is disposed proximate the inlet for the fluid and the second end of the straining element is disposed proximate the debris drain. The first end of the straining element is coextensive with the inlet of the body.

In various embodiments, the first end of the straining element includes a flange, and the inlet of the body includes a flange with a groove sized to receive the flange of the straining element.

In at least one embodiment, the straining element is disposed in the cavity of the body such that the first end of the straining element lies in a plane generally parallel to a plane including the inlet of the body and the second end of the straining element is disposed proximate the debris drain.

In one or more embodiments, a longitudinal axis of the tubular body extends from the first end to the second end, with the first end lying in a plane oblique to the longitudinal axis of the tubular body, and the second end lying in plane substantially perpendicular to the longitudinal axis of the tubular body.

In various embodiments, the first end of the straining element and the second end of the straining element are both open ends.

In some of the embodiments, the straining element is configured to be inserted into the cavity of the body through the inlet of the body.

In at least one embodiment, the body further comprises a cover plate and the cover plate includes the debris drain.

In some embodiments, the straining element includes at least one corrugation disposed between the first end and the second end.

In one or more embodiments, the body includes at least one shoulder configured to maintaining the straining element within the cavity of the body.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

As mentioned above, a new pipeline strainer has been invented which decreases the pressure drop associated with fluid passing there through. A pipeline strainer according to one or more embodiments is believed to reduce the pressure drop associated with the fluid flowing there though by increasing the area of the straining element in the flow path of the fluid. Without intending to be bound or limited to any particular configuration, it is believed that the amount has been increased because the flange at the bottom of the debris collection chamber has been eliminated, the first end of the straining element has been moved closer to the inlet of the pipeline strainer, the bottom of the debris collection chamber has been moved closer to the outlet, or a combination thereof. Either of these, alone or in combination, allows the debris collection chamber to be less obliquely positioned to the flow path of the fluid through the pipeline strainer. This change in the angular relationship is believed to increase the amount of the straining element that can be disposed in the flow path of the fluid. As will be appreciated, increasing the amount of straining element in the flow path will lower the pressure drop associated with the fluid flowing through the straining element.

Additionally, without the flange at the end of the debris collection chamber, simpler designs can be used to allow for the debris collection chamber to be opened and cleaned much more easily than conventional designs.

Furthermore, such designs allow for lighter pipeline strainers because the size of the body may decrease.

Accordingly, with reference the attached drawings, one or more embodiments of the present invention will now be described with the understanding that the described embodiments are merely preferred and are not intended to be limiting.

Figure 1:
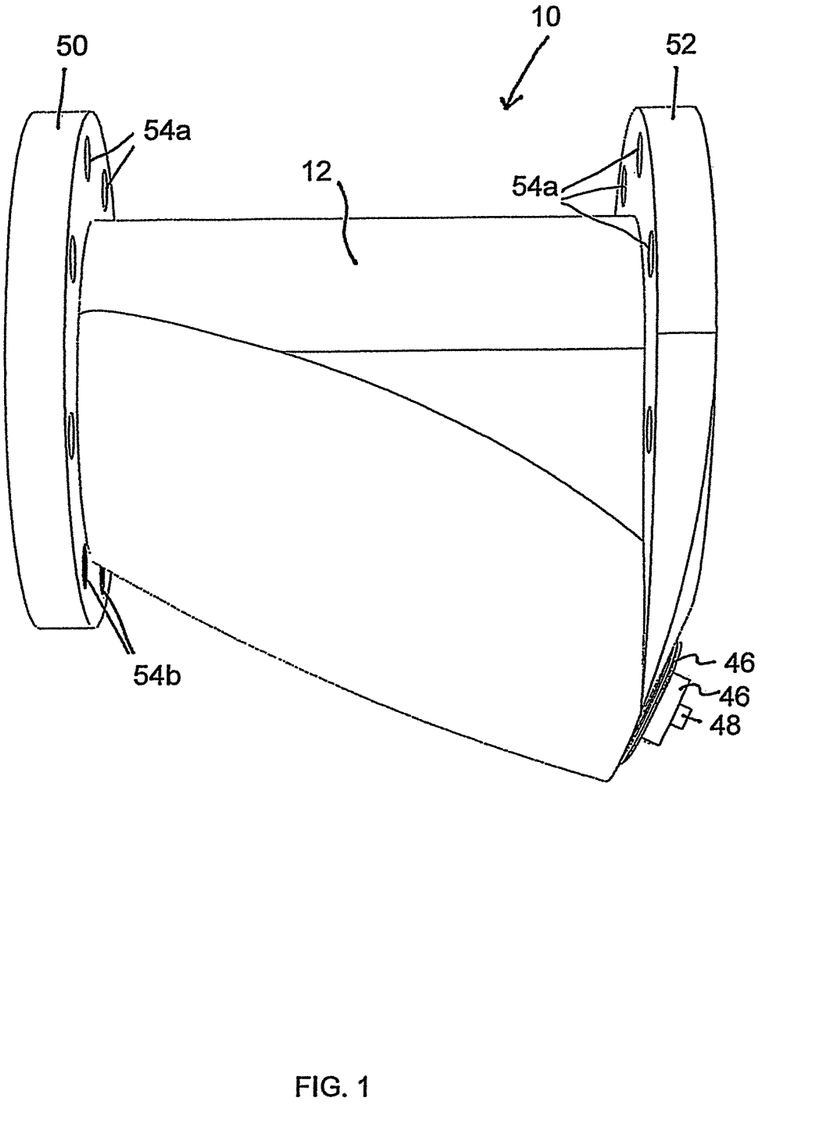
FIG. 1 is a side perspective view of a pipeline strainer according to one or more embodiments of the present invention.

With reference to FIG. 1, a pipeline strainer 10 according to one or more embodiments of the present invention comprises a body 12 with a Y shape. The body 12 can be made from a variety of appropriate materials, including, for example, iron, carbon steel, carbon moly, stainless steel, chrome moly, aluminum, bronze, monel, nickel, HASTELLOY® B, HASTELLOY® C, titanium, and plastic.

Figure 2:
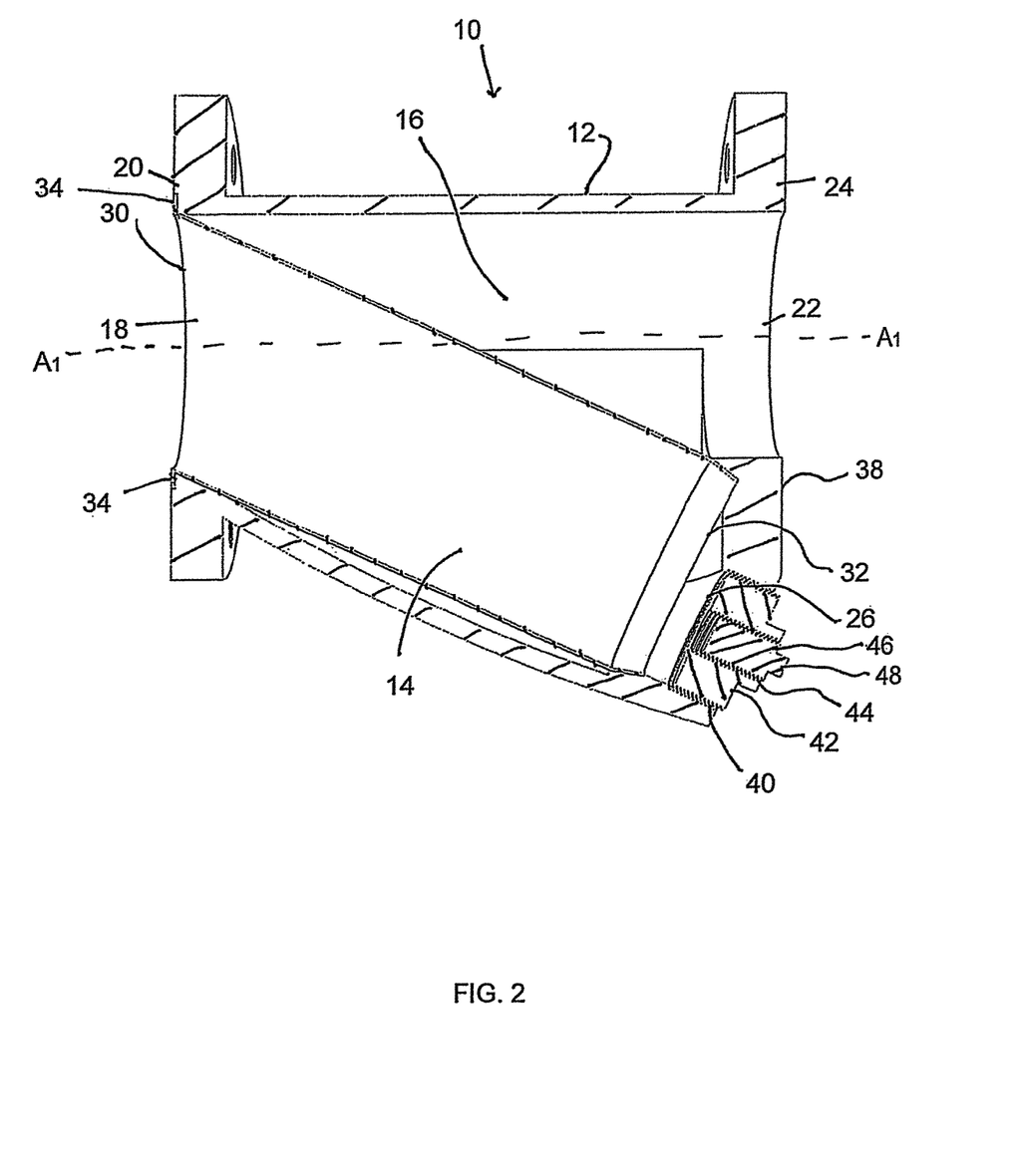
FIG. 2 is a cutaway side perspective view of the pipeline strainer shown in FIG. 1.

Turning to FIG. 2, the pipeline strainer 10 also includes a straining element 14. The body 12 also includes a cavity 16 disposed inside of the body 12. The body 12 includes an inlet 18 to the cavity 16 for a fluid disposed at a first end 20 of the body 12. An outlet 22 from the cavity 16 for the fluid is disposed at a second end 24 of the body 12. The inlet 18 and outlet 22 of the body 12 are both generally disposed along an axis $A_1$.

Figure 3:
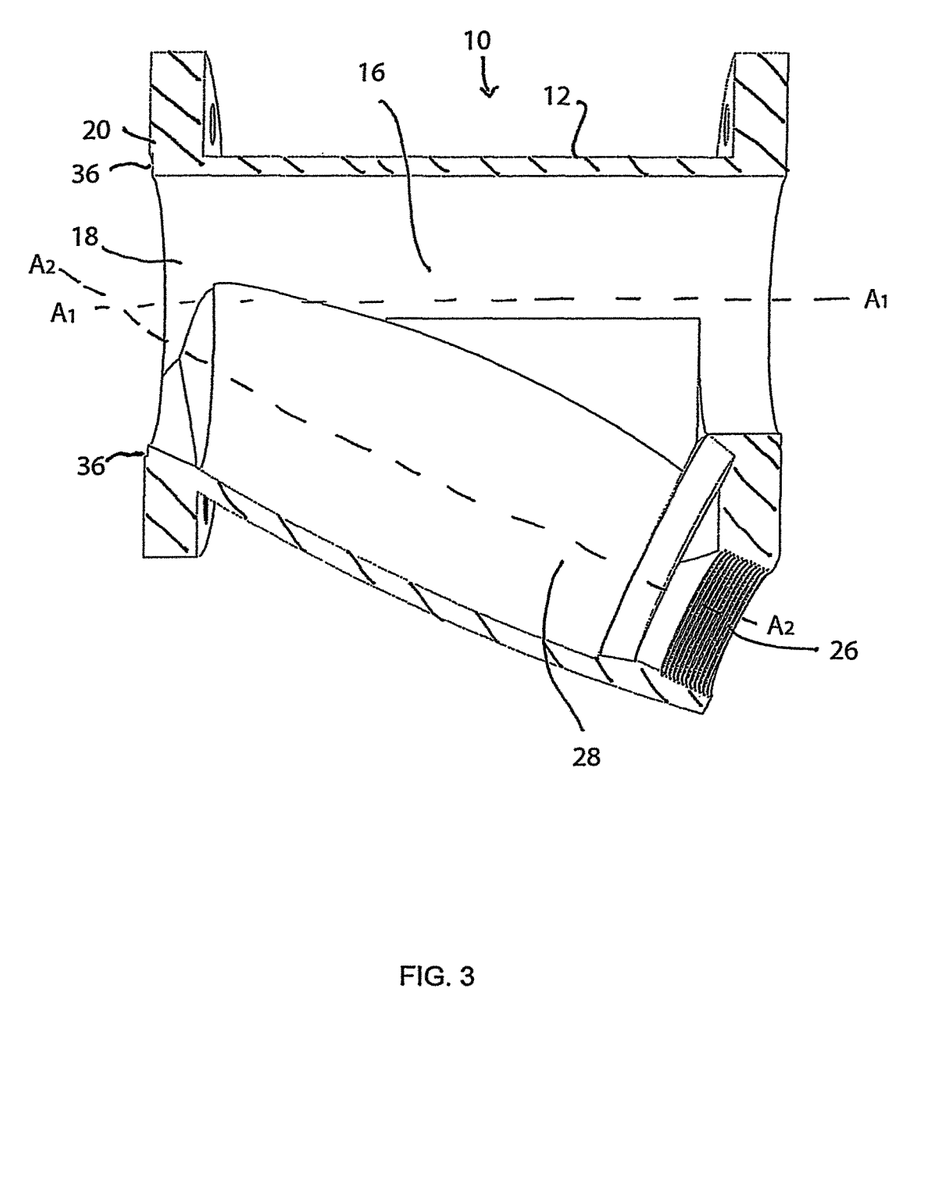
FIG. 3 is another cutaway side perspective view of the pipeline strainer shown in FIG. 1 with a straining element and plug removed from the pipeline strainer.

As can be seen best in FIG. 3, the body 12 also includes a debris drain 26 that is disposed in a portion of the cavity 16 that comprises a debris collection chamber 28. An axis $A_2$ of the debris collection chamber 28 is oblique with respect to the axis $A_1$ of the body 12 which includes the inlet 18 and the outlet 22. The angular relationship of the axes $A_1$, $A_2$ provides the body 12 with the Y shape. Compared with conventional designs, the designs according to the present invention may be less obliquely angled. More specifically, conventional designs may include an angle between the axis $A_2$ of the debris collection chamber 28 and the axis $A_1$ of the body 12 that is between 30 to 60°. According to some of the embodiments of the present invention, the angle between the axis $A_2$ of the debris collection chamber 28 and the axis $A_1$ of the body 12 may be less than 30° and greater than 9.5°.

Returning to FIG. 2, the straining element 14 is disposed in the body 12 and removes debris in the fluid passed through the body 12 from the inlet 18 to the outlet 22. Various materials can be used for the straining element 14 including carbon steel, stainless steel, monel, HASTELLOY® B, HASTELLOY® C, alloy 20, nickel, brass, copper, galvanized steel, INCOLOY®, INCONEL®, titanium, aluminum, and plastic, to name a few. The straining element 14 can also be lined with various coatings to minimize corrosion, such as epoxy, asphalt, polytetrafluoroethylene, vinyl, polychlorotrifluoroethene, rubber, neoprene, baked phenolic, and plating with zinc, cadmium, nickel, galvanizing, etc.

An consideration in the selection of a straining element 14 material is the size of the perforations, mesh or wedge wire opening used in the making of the straining element 14 based upon the size and quantity of particles which can pass through downstream equipment without causing damage to the equipment. The use of smaller holes than those actually required, can lead to too-frequent cleaning, excessive pressure drops, and screens constructed of thinner metal which will withstand less pressure differential. Generally, stainless steel perforated metal may be typically obtained in a thickness which is one gage thickness less than the diameter of the punched holes. Carbon steel and brass can be obtained in approximately the same thickness as the hole diameter. A common way to accomplish fine straining in large straining elements 14 is by mesh lining a larger hole, heavier gage perforated plate.

The capacity ratio, or open area ratio (OAR) of the straining element 14 influences such operating characteristics as the length of time it can operate without cleaning and the created pressure loss. The OAR is the relationship between internal cross sectional area (flow area) of the pipe and the open flow area of the material which makes up the straining element 14.

A straining element 14 with at least 100% OAR, or 1-to-1 ratio, would provide an unrestricted flow area equal to that of the pipe while the element was clean. As clogging occurs, however, flow would provide restricted flow, after the element became 50% clogged. A straining element 14 with a 400% OAR is acceptable for general heating and air conditioning service. Additionally, larger OARs would be appropriate for flow in which much debris is expected to be strained or where very viscous fluids are being handled.

When considering the OAR of a straining element 14, there are two accepted methods of analysis used by various specifying agencies and manufacturers. One method maintains a "line of sight" reasoning and uses the multiple of the open areas for elements in series. In this method, a 60% open area material in series with a 40% open area material has a resultant combined open area of 24% (i.e., as in accordance with military standards).

An alternative method allows the open area of the more restrictive element in series to be used. This would be 40% for the example above (i.e. as in accordance with Underwriter Laboratory Standards). The method used influences the estimated operating pressure drop, as well as design decisions such as sizing.

As an example, fuel oils are generally strained to a fine degree to protect small orifices in burner nozzles. This requires a fine woven mesh be used in series with a reinforcing perforated plate. Due to the fact that the perforated plate may have a 50% open area and the mesh 30%, the resultant combined open area may be considered to be only 15% if there is no flow path other than line of sight through the two element in series. This would require a straining element 14 with an OAR of 250%, which would be considered a high capacity, large bodied straining element 14. However, this same straining element 14 using only the perforated plate would have an OAR more than three times as great. Thus, for a given straining element 14, the OAR may be varied by using various perforations or meshes having different open areas.

Most pump installations designed for reasonable velocities will permit approximately a 2-psi drop across the straining element 14. When the straining element 14 becomes clogged, the pressure drop varies with the clogging pattern experienced and the type of the straining element 14 being used. If large amounts of solids are expected, use a straining element 14 with a high net open area. As a straining element 14 becomes clogged to the point where the OAR of the straining element 14 approaches the pipe area, the pressure drop across the straining element 14 increases very rapidly and unpredictably. It is at this point, therefore, that it is recommended the straining element 14 be cleaned, discussed below, otherwise, a large differential pressure will develop. The maximum differential pressure the straining element 14 can withstand varies widely with the straining element 14 type, line size and material used.

Figure 4:
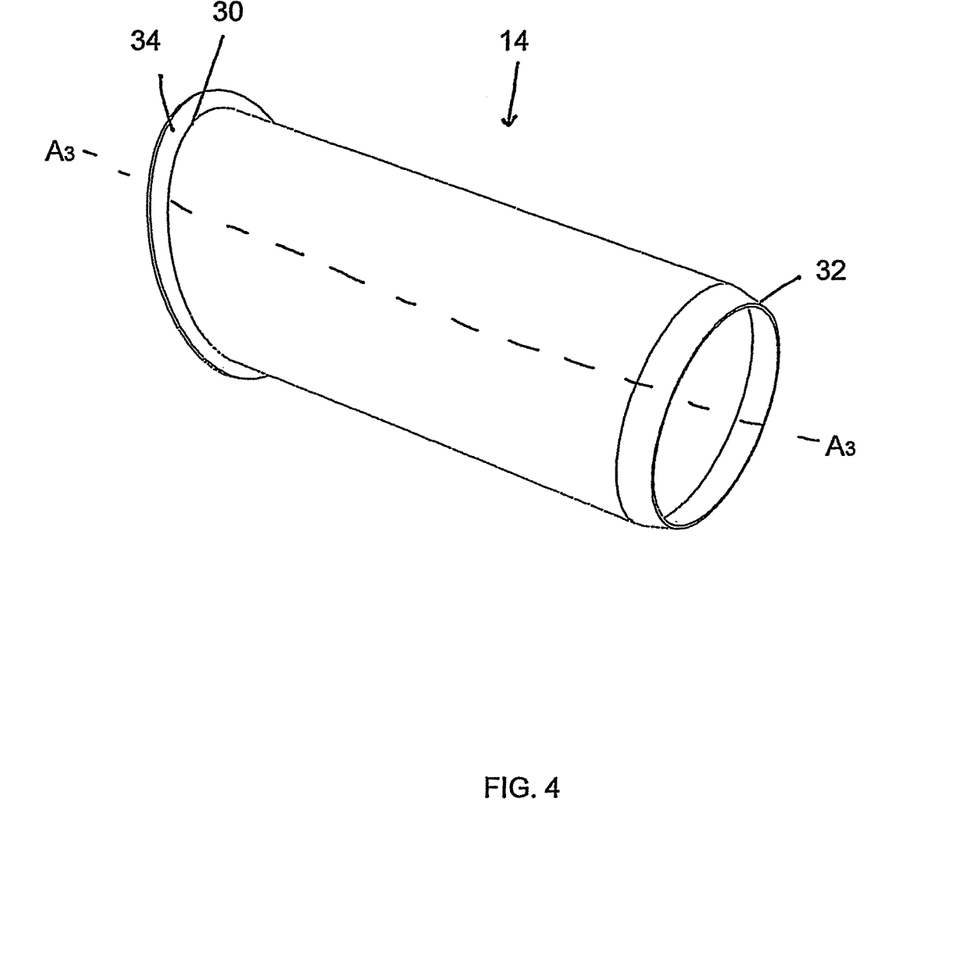
FIG. 4 is an isometric view of a side and back of a straining element used in a pipeline strainer according to one or more embodiments of the present invention.
Figure 5:
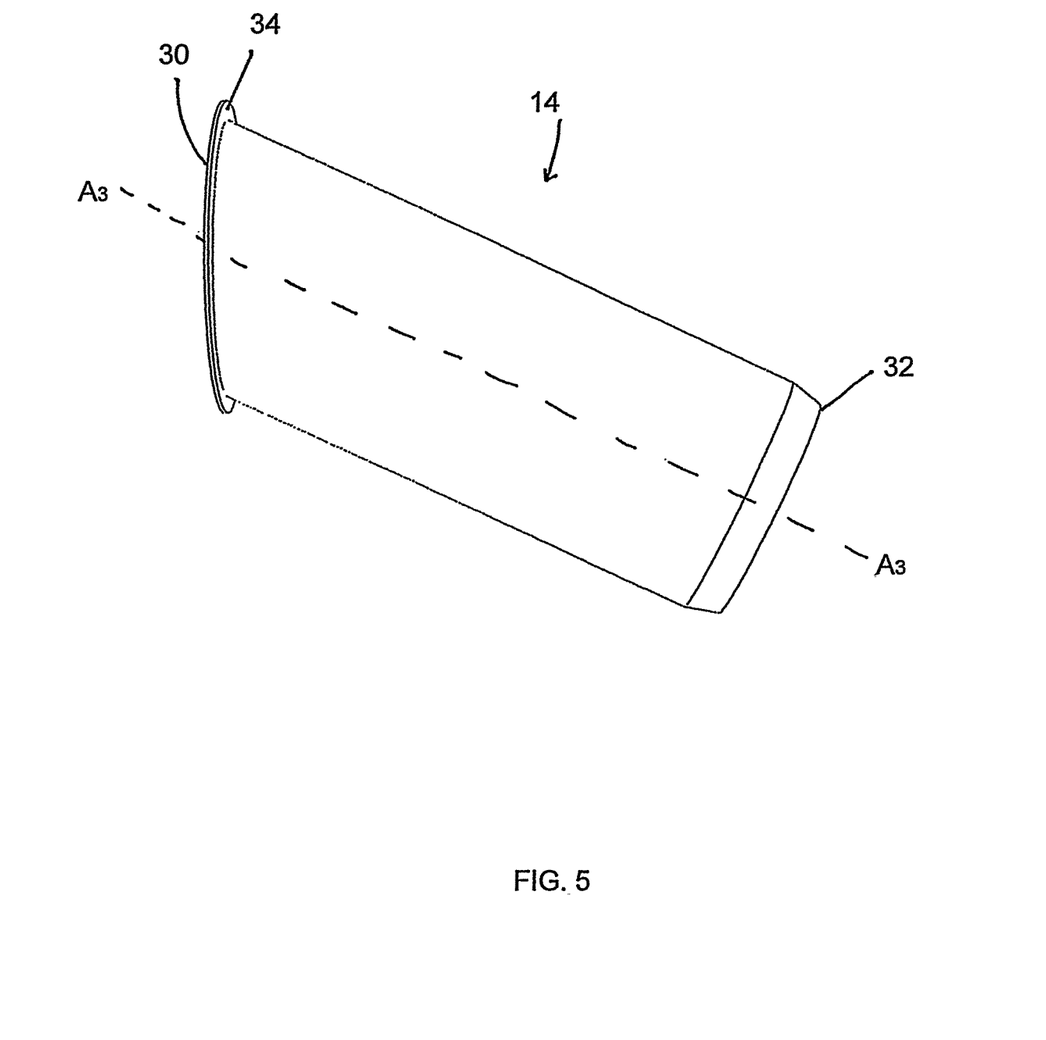
FIG. 5 is a side elevational view of the straining element shown in FIG. 4.

Turning to FIGS. 4 and 5, the straining element 14 includes a first end 30, a second end 32, and a longitudinal axis $A_3$ from the first end 30 to the second end 32. Preferably, both the first end 30 and the second end 32 are open. The second end 32 is disposed proximate the debris drain 26 of the body 12, when the straining element 14 is inserted therein. See, FIG. 2.

In various embodiments, at least the first end 30 of the straining element 14 is planar and lies in a first plane. The second end 32 of the straining element 14 may also be planar and lie in a second plane. In at least one embodiment, the first plane, which includes the first end 30 of the straining element 14, is disposed obliquely to the longitudinal axis $A_3$ of the straining element 14. The second end 32 of the straining element 14 may be disposed perpendicular to the longitudinal axis $A_3$ of the straining element 14.

Additionally, in one or more embodiments, the first plane, which includes the first end 30 of the straining element 14, is disposed generally parallel to a plane formed by the inlet 18 of the body 12. By "generally parallel" it is meant that the planes are +/−10 degrees from parallel. Although not required, it is preferred that the first end 30 of the straining element 14 and the inlet 18 of the body are coextensive, meaning, the two share at least a portion of the same plane.

As can be seen in more detail in FIG. 2, the first end 30 of the straining element 14 may be coextensive with the inlet 18. Additionally, the first end 30 of the straining element 14 may include a flange 34 extending outwardly away from the straining element 14. The inlet 18 of the body 12 may include a groove 36 or other notched surface sized to receive the flange 34 of the straining element 14. See, FIG. 3.

In one or more of these embodiments, the straining element 14 is configured and sized such that the straining element 14 is inserted into the cavity 16 through the inlet 18 of the body 12. As discussed above, this allows an outer surface 38 of the body 12 proximate the debris drain 26 to be smaller. This, in turn, allows for the longitudinal axis $A_2$ of the debris collection chamber 28 to be brought closer to the longitudinal axis $A_1$ of the body 12. Accordingly, the amount of the straining element 14 that is disposed in the direct flow path of the fluid from the inlet 18 of the body 12 to the outlet 22 of the body 12 can be increased, which will decrease the pressure drop associated with passing the fluid through the pores of the straining element 14.

As mentioned above, since the straining element 14 will remove (or retain) particulate material in the fluid, the straining element 14 must be periodically cleaned. According to various embodiments of the present invention, and as shown in FIG. 2 the debris drain 26 may comprise a threaded bore 40 and a plug 42. The plug 42 includes an outer circumferential surface that is threaded to engage the threaded bore 40. The plug 42 may be sized to be smaller than the second end 32 of the straining element 14.

In a most preferred embodiment, the plug 42 also includes a threaded bore 44 there though, and a second plug 46. The second plug 46 includes a threaded outer circumferential surface that is threaded so as to engage the threaded bore 44 of the first plug 42. An end 48 of the second plug 46 may be configured to cooperate with a tool, such as a wrench, ratchet, or other similar tool that can be used to rotate the first plug 42 and the second plug 46. The threaded bores 44 and 40 may be oppositely threaded, i.e., one including a right-handed thread and the other including a left-handed thread, however, this is not required. In some embodiments or when in use, the second plug 46 may be replaced with a valve (not shown), that allows debris collected in the straining element 14 to be drained by merely opening the valve. The plug 42, which is larger, can be removed for a visual inspection of the straining element 14 or to allow for removal of larger debris that cannot pass through the valve (or the threaded bore 44).

The use of the threaded bore 40 and plug 42 will also save time when opening and closing the debris drain 26 compared to prior art designs that comprise an end cap with flanges and a plurality of fasteners used to secure the end cap to the pipeline strainer.

Retuning to FIG. 1, as discussed above, the pipeline strainer 10 is typically disposed within conduits or piping. In order to secure the ends 20, 24 of the pipeline strainer 10 to the conduits or other piping, the first end 20 of the pipeline strainer 10 and the second end 24 of the pipeline strainer 10 may each include a flange 50, 52 extending outwardly away therefrom. The flanges 50, 52 may each include a plurality of apertures 54a, 54b, each sized to receive a fastener (not shown), such as a bolt or screw. The apertures 54a, 54b may also be configured to be in alignment with apertures on flanges on the conduits (not shown). In some embodiments of the present invention, at least one aperture 54b in the flanges 50, 52 of the pipeline strainer 10 comprises a threaded bore, and at least one aperture 54a is smooth. By smooth it is meant that the inner surface of the aperture 54a is not engaged by a fastener extending there through. These fasteners are held in place by another item, such as a nut (not shown).

Figure 6:
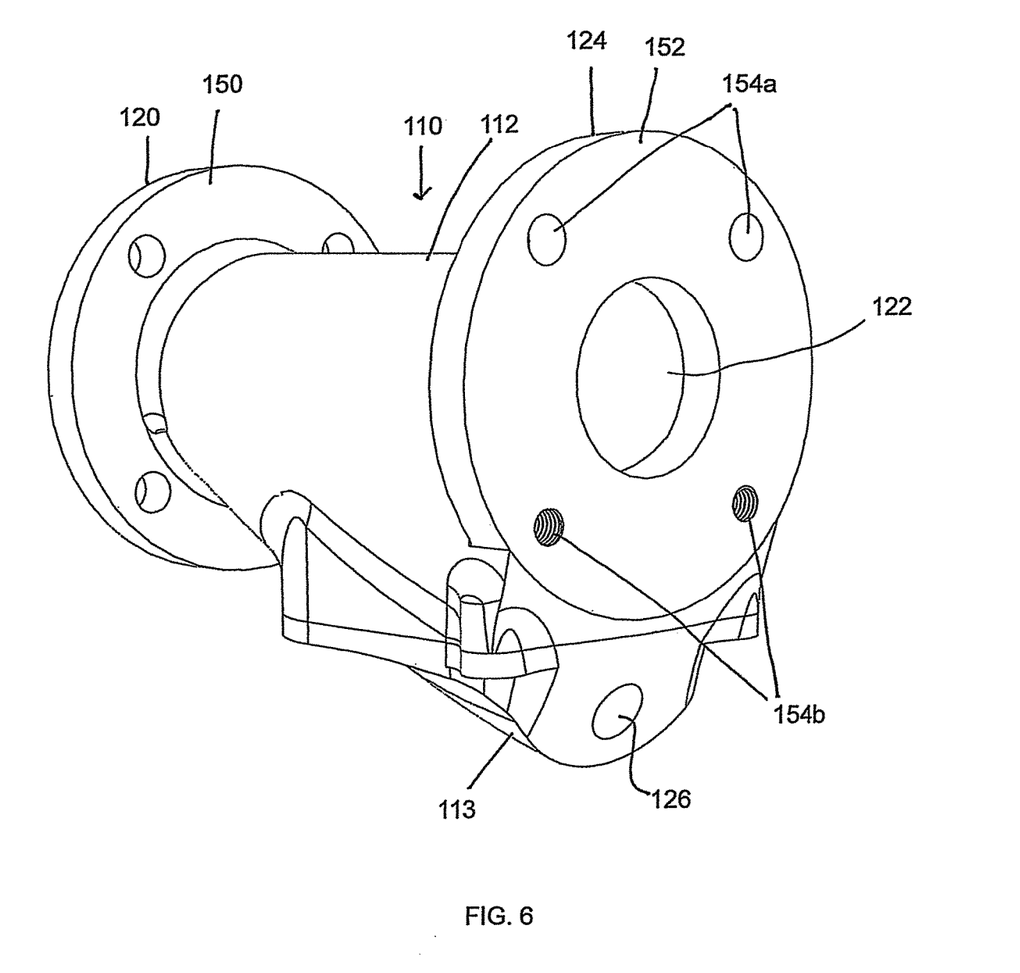
FIG. 6 is a side and rear isometric view of another embodiment of a pipeline strainer according to the present invention.
Figure 7:
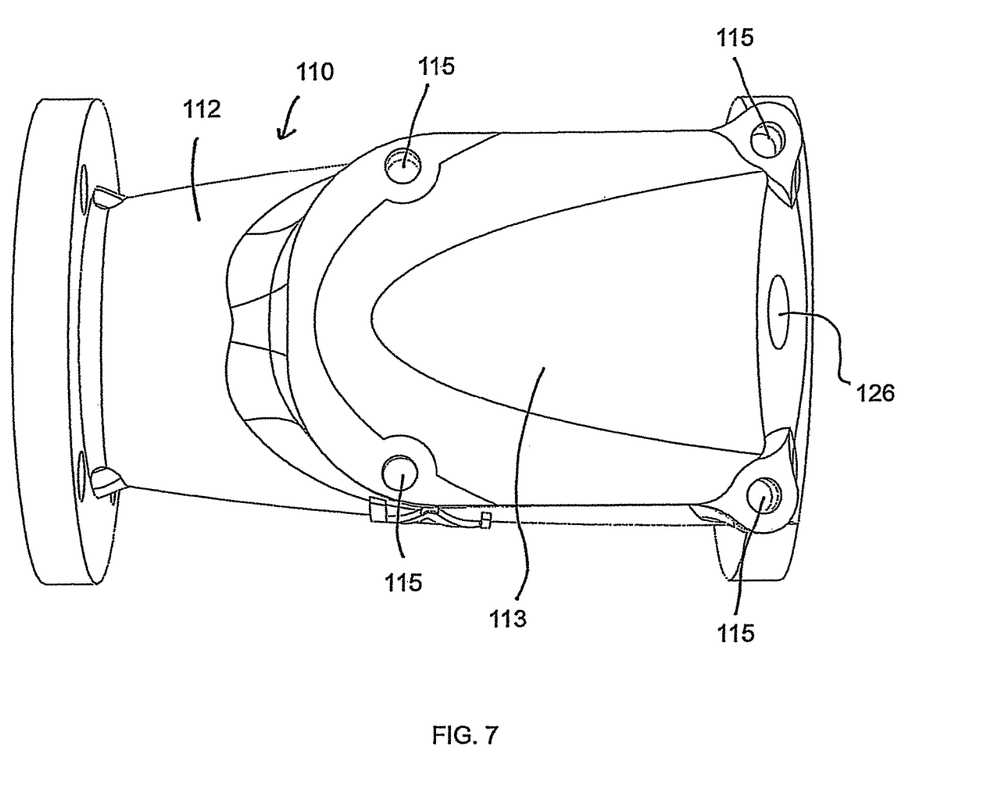
FIG. 7 is a bottom perspective view of the pipeline strainer shown in FIG. 6.

Turning to FIG. 6, another embodiment of a pipeline strainer 110 is shown. The pipeline strainer 110 includes a body 112 that together with a cover plate 113 has a Y shape. The cover plate 113 includes a debris drain 126 that may include a plug (not shown). Turning to FIG. 7, the cover plate 113 may be removably secured to a bottom of the body 112 via fasteners (not shown) and threaded apertures 115.

Figure 8:
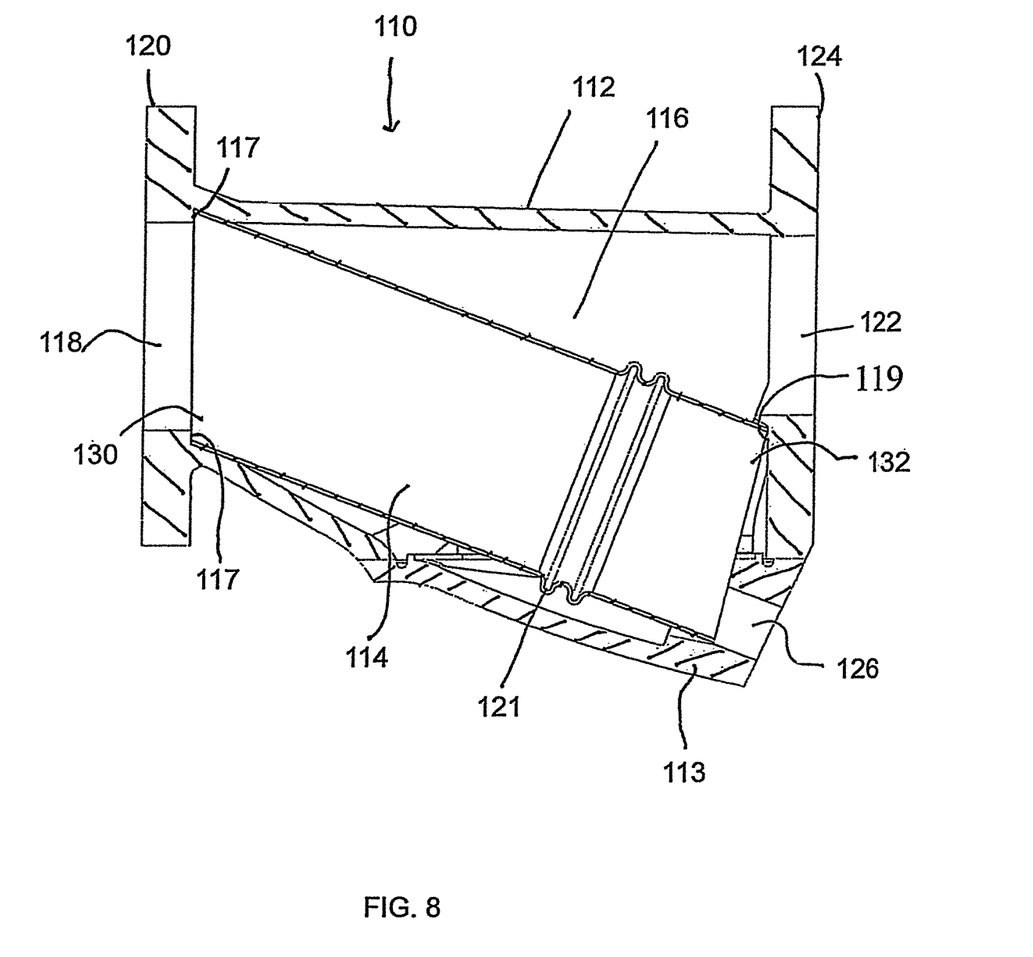
FIG. 8 is a cutaway side view of the pipeline strainer shown in FIG. 6 with a straining element according to various embodiments of the present invention.

With reference to FIG. 8, the cover plate 113 may be removed from the body to allow a straining element 114 to be inserted into a cavity 116 of the body 112. When inserted into the cavity 116, a first end 130 of the straining element 114 will be disposed generally parallel to the inlet 118 of the body 112. In order to maintain the positioning of the straining element, the cavity 116 may include a front shoulder 117 disposed proximate a first end 120 of the body 112 and a rear shoulder 119 disposed proximate a second end 124 of the body 112. As can be appreciated, a portion of the straining element 114 will extend out of the cavity 116 of the body 112 and will be covered by the cover plate 113 when the cover plate 113 is secured to the body 112. The remaining portions of the pipeline strainer 110 shown in FIGS. 6 to 8 include the same or similar features as the pipeline strainer 10 shown in FIGS. 1 to 3. Therefore those portions of the description from above are incorporated herein with the understanding that the reference numerals in FIGS. 6 to 8 have been increased by "100."

Figure 9:
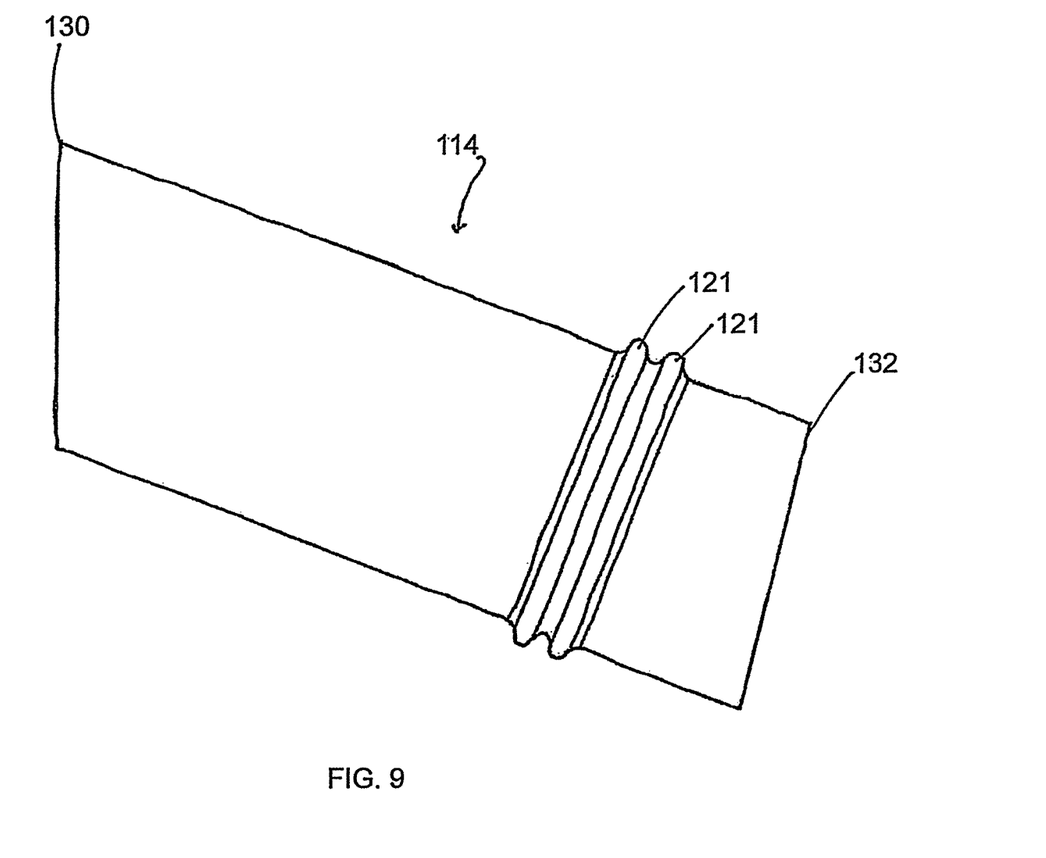
FIG. 9 is a side elevational view of the straining element shown in FIG. 8.

As shown in FIG. 9, the straining element 114 includes at least one corrugation 121. The corrugation(s) 121 provide the straining element 114 with flexibility which is particularly desirable when inserting the straining element 114 into the cavity 116 to better control the bending of the straining element 114. The flexibility is also desirable when the cover plate 113 is secured to the body 112 to allow the straining element 114 to absorb compression forces without deforming. The corrugation(s) 121 may be formed by utilizing rollers on both surfaces (inner and outer) of the straining element 114. As depicted in the Figures, the corrugation(s) 121 extends outward from the straining element 114; however, it is contemplated that the corrugation(s) 121 may extend inward as well, or include both inward and outward corrugations. It is also preferred that the corrugation(s) 121 are disposed closer to the second end 132 of the straining element 114 compared to the first end 130 of the straining element 114. The straining element 114 could be utilized in pipeline strainer 10 shown in FIGS. 1 to 3. The remaining portions of the straining element 114 shown in FIGS. 8 and 9 include the same or similar features as the straining element shown in FIGS. 4 and 5 and thus those portions of the description from above are incorporated herein.

As discussed above, the various embodiments of the present invention provide a pipeline strainer that has a lower pressure drop and is easier to clean.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pipeline strainer comprising:
   a body comprising a Y shape, a cavity, an inlet for a fluid lying in a first plane, an outlet for the fluid, and a cover plate removable secured to the body, the cover plate including a debris drain, and the inlet including at least one shoulder; and,
   a straining element for removing debris from the fluid, the straining element comprising a first end lying in a second plane and a second end,
   wherein the straining element is disposed in the cavity of the body such that the second plane is generally parallel to the first plane and the second end of the straining element is disposed proximate the debris drain, and
   and wherein the first end of the straining element abuts the at least one shoulder at the inlet.

2. The pipeline strainer of claim 1 wherein the first end of the straining element and the second end of the straining element are both open ends.

3. The pipeline strainer of claim 1 wherein the straining element includes at least one corrugation disposed between the first end and the second end.

4. The pipeline strainer of claim 1 wherein the first plane and the second plane are coextensive.

5. The pipeline strainer of claim 1 wherein the debris drain comprises at least one threaded aperture and at least one plug for each threaded aperture.

6. The pipeline strainer of claim 5 wherein the at least one plug of the debris drain further comprises at least one threaded aperture.

7. The pipeline strainer of claim 1 wherein the first end of the straining element includes a flange.

8. The pipeline strainer of claim 1 further comprising:
a first axis from the inlet for fluid to the outlet for fluid and a second axis from the inlet for fluid to the debris drain forming an angle of less than 30°.

9. A pipeline strainer comprising:
a body comprising a Y shape, a cavity, an inlet, an outlet, and a debris drain, wherein the cavity includes at least one shoulder disposed at the inlet; and,
a straining element disposed in the cavity of the body, the straining element comprising a tubular body with a first end and a second end, and,
wherein the straining element is disposed in the cavity of the body such that the first end of the straining element lies in a first plane generally parallel to a second plane including the inlet of the body and the first end of the straining element abutting the inlet at the at least one shoulder, and wherein the second end of the straining element is adjacent the debris drain, and
the at least one shoulder maintaining the straining element within the cavity of the body.

10. The pipeline strainer of claim 9 wherein the debris drain comprises at least one threaded aperture and at least one plug for each threaded aperture.

11. The pipeline strainer of claim 9 wherein a longitudinal axis of the tubular body extends from the first end to the second end, the first end being planar and lying in a plane oblique to the longitudinal axis of the tubular body, the second end being planar and lying in plane substantially perpendicular to the longitudinal axis of the tubular body.

12. The pipeline strainer of claim 9 wherein the first end of the straining element includes a flange.

13. The pipeline strainer of claim 9 wherein the first plane and the second plane are coextensive.

14. The pipeline strainer of claim 9 wherein the body further comprises a cover plate, and the cover plate includes the debris drain.

15. A pipeline strainer comprising:
a body comprising, a cavity, an inlet for fluid, an outlet for the fluid, and a debris drain, a first axis from the inlet for fluid to the outlet for fluid and a second axis from the inlet for fluid to the debris drain forming an angle of less than 30°, the inlet including at least one shoulder; and,
a straining element comprising a first end, a second end and a longitudinal axis extending from the first end to the second end, the first end of the straining element abutting the at least one shoulder of the inlet for the fluid and the second end of the straining element adjacent the debris drain.

16. The pipeline strainer of claim 15 wherein the first end of the straining element includes a flange.

17. The pipeline strainer of claim 15 wherein the straining element is disposed in the cavity of the body such that the first end of the straining element lies in a plane generally parallel to a plane including the inlet of the body.

18. The pipeline strainer of claim 15 wherein the body further comprises a cover plate, and the cover plate includes the debris drain.

19. The pipeline strainer of claim 15 wherein the straining element is includes at least one corrugation between the first end and the second end.

20. The pipeline strainer of claim 15 wherein the body includes at least one shoulder configured to maintain the straining element within the cavity of the body.

* * * * *